United States Patent
Ni et al.

(10) Patent No.: US 10,266,685 B2
(45) Date of Patent: Apr. 23, 2019

(54) BIMODAL POLYPROPYLENE COMPOSITIONS AND METHOD OF MAKING SAME

(71) Applicant: ExxonMobil Chemical Patents Inc., Baytown, TX (US)

(72) Inventors: Yi Ping Ni, Shanghai (CN); Rohan A. Hule, Houston, TX (US); Sudhin Datta, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 53 days.

(21) Appl. No.: 15/628,191

(22) Filed: Jun. 20, 2017

(65) Prior Publication Data

US 2018/0022907 A1  Jan. 25, 2018

Related U.S. Application Data

(60) Provisional application No. 62/366,352, filed on Jul. 25, 2016.

(51) Int. Cl.
| | |
|---|---|
| *C08L 23/12* | (2006.01) |
| *C08F 4/6592* | (2006.01) |
| *C08L 23/14* | (2006.01) |
| *B29B 7/30* | (2006.01) |
| *B29B 7/00* | (2006.01) |
| *B29B 7/72* | (2006.01) |
| *B29B 7/82* | (2006.01) |
| *G01N 30/00* | (2006.01) |
| *B29B 7/48* | (2006.01) |
| *C08F 4/659* | (2006.01) |

(52) U.S. Cl.
CPC .............. *C08L 23/12* (2013.01); *B29B 7/007* (2013.01); *B29B 7/30* (2013.01); *B29B 7/726* (2013.01); *B29B 7/82* (2013.01); *C08F 4/65922* (2013.01); *C08L 23/14* (2013.01); *B29B 7/484* (2013.01); *C08F 4/65912* (2013.01); *C08F 4/65916* (2013.01); *G01N 2030/486* (2013.01)

(58) Field of Classification Search
CPC ...... C08L 23/12; C08L 23/14; C08F 4/65922; C08F 4/65916; C08F 4/65912; C08F 110/06; C08F 4/65927; C08F 2500/12; C08F 2500/01; C08F 2500/04; C08F 2500/17; C08F 2500/02; B29B 7/82; B29B 7/726; B29B 7/007; B29B 7/30; B29B 7/484

See application file for complete search history.

(56) References Cited

U.S. PATENT DOCUMENTS

| | | | |
|---|---|---|---|
| 6,723,795 B1 | 4/2004 | Dupire et al. | |
| 8,722,805 B2 | 5/2014 | Filipe et al. | |
| 9,580,585 B2 | 2/2017 | Lee et al. | |
| 9,587,044 B2 | 3/2017 | Hafner et al. | |
| 2011/0086276 A1* | 4/2011 | Brant et al. ............. | C08F 10/00 429/246 |
| 2011/0272860 A1* | 11/2011 | Walia et al. ............. | C08L 23/10 264/328.17 |
| 2015/0274908 A1 | 10/2015 | Yanagishita et al. | |

FOREIGN PATENT DOCUMENTS

| | | |
|---|---|---|
| JP | 2012/229343 A | 11/2012 |
| WO | 2015/009472 A | 1/2015 |
| WO | 2016/053467 A | 4/2016 |

* cited by examiner

*Primary Examiner* — Nathan M Nutter

(57) ABSTRACT

The present invention relates to a bimodal polypropylene composition comprising a blend of a HMW polypropylene component and a LMW polypropylene component, where the high molecular weight (HMW) component of the bimodal composition has a z-average molecular weight Mz of more than 400,000 g/mole, and a process to make such composition. The composition is suitable for thermoformed articles and injection molded articles.

26 Claims, 4 Drawing Sheets

BIMODAL POLYPROPYLENE COMPOSITIONS AND METHOD OF MAKING SAME

PRIORITY CLAIM

This application claims priority to and the benefit of U.S. Ser. No. 62/366,352, filed Jul. 25, 2016 and is incorporated by reference in its entirety.

FIELD OF THE INVENTION

The present invention(s) relates to bimodal polypropylene compositions, where the high molecular weight (HMW) component of the bimodal compositions has a z-average molecular weight Mz of 400,000 g/mole or more, and methods of making such compositions.

BACKGROUND OF THE INVENTION

Improved melt strength in combination with superior processability has been a long-standing interest in the polypropylene (PP) industry. Some attempts to achieve this result include the use of bimodal PP blends, either in situ (in reactor) or ex situ (extruder blends), which include a combination of a relatively low molecular weight polypropylene (or high MFR) and a relatively high molecular weight polypropylene (or low MFR). The challenge is particularly relevant for blends made from single-site catalysts, which alone are not easily processable due to narrow molecular weight distribution.

Use of a high molecular weight PP may improve the melt strength of polypropylene blends. However, inclusion of HMW PP in blends may be accompanied by a loss in the processability due to increased viscosity if the properties of the components are not properly balanced. Depending on the ultimate application, solutions to achieve a reasonable result between melt strength and processability may involve adjusting the properties of the individual polypropylene components and/or addition of some other polymeric additive such as an elastomeric component, either of which may be accompanied by forming bimodal PP blends. While in-reactor methodologies to form bimodal PP blends are well documented, physical blending of two unimodal polypropylenes to realize bimodality has not shown improved melt strength without sacrificing processability.

The present invention describes new bimodal PP compositions prepared by melt blending exhibiting a good balance of melt strength and processability.

SUMMARY OF THE INVENTION

Disclosed are polypropylene compositions comprising at least one high molecular weight HMW polypropylene component and at least one low molecular weight LMW polypropylene component, wherein the HMW polypropylene component has a z-average molecular weight Mz of more than 400,000 g/mole, and is in an amount in the range of from 80.0 wt % to 99.9 wt %, based on the total weight of the composition, and wherein the polypropylene composition has any one or more of the following features:

a) an extensional viscosity of the composition of more than 10,000 Pa·s, when measured on an extensional rheometer at a temperature of 172° C., and an extensional rate of 10 second$^{-1}$ measured at 0.3 seconds;
b) a zero shear viscosity of the composition no less than the zero shear viscosity of the HMW polypropylene component alone, as determined in accordance with Small Angle Oscillatory Shear (SAOS) Rheology Test; and/or
c) a relaxation time of the composition of more than 0.9 seconds, as determined in accordance with Small Angle Oscillatory Shear (SAOS) Rheology Test.

Disclosed is a process to form a polypropylene composition comprising at least one HMW polypropylene component in an amount in the range of from 80.0 wt % to 99.9 wt %, based on the total weight of the composition, and at least one LMW polypropylene component, in at least one single pass extrusion, which process comprises: a) combining the HMW polypropylene component having a z-average molecular weight Mz of more than 400,000 g/mole, with the LMW polypropylene component; b) melt blending in an extruder the components in step a) at a melt temperature in the range from 350° C. to 450° C.; and c) isolating the blend produced in step b) as the polypropylene composition.

Disclosed is a polymerization process to form a HMW polypropylene component having a z-average molecular weight Mz of more than 400,000 g/mole, comprising contacting propylene monomers with a catalyst system comprising a metallocene catalyst compound represented by the formula:

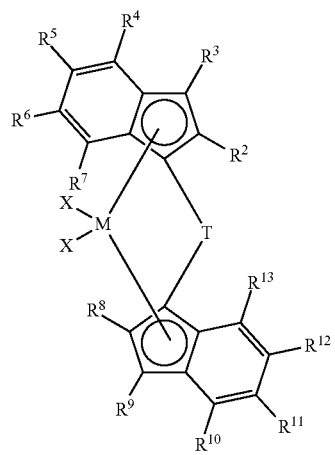

where:
M is a group 4 metal, preferably Hf or Zr;
T is a bridging group;
X is an anionic leaving group;
each $R^2$, $R^3$, $R^5$, $R^6$, $R^7$, $R^8$, $R^9$, $R^{11}$, $R^{12}$, and $R^{13}$ is independently, a halogen atom, hydrogen, hydrocarbyl, substituted hydrocarbyl, halocarbyl, substituted halocarbyl, silylcarbyl, substituted silylcarbyl, germylcarbyl, substituted germylcarbyl substituents or a —NR'$_2$, —SR', —OR', —OSiR'$_3$, or —PR'$_2$ radical, wherein R' is one of a halogen atom, a C1 to C10 alkyl group, or a C6 to C10 aryl group; and
$R^4$ and $R^{10}$ are phenyl groups substituted at the 3' and 5' positions.

DETAILED DESCRIPTION OF THE INVENTION

Figure 1:
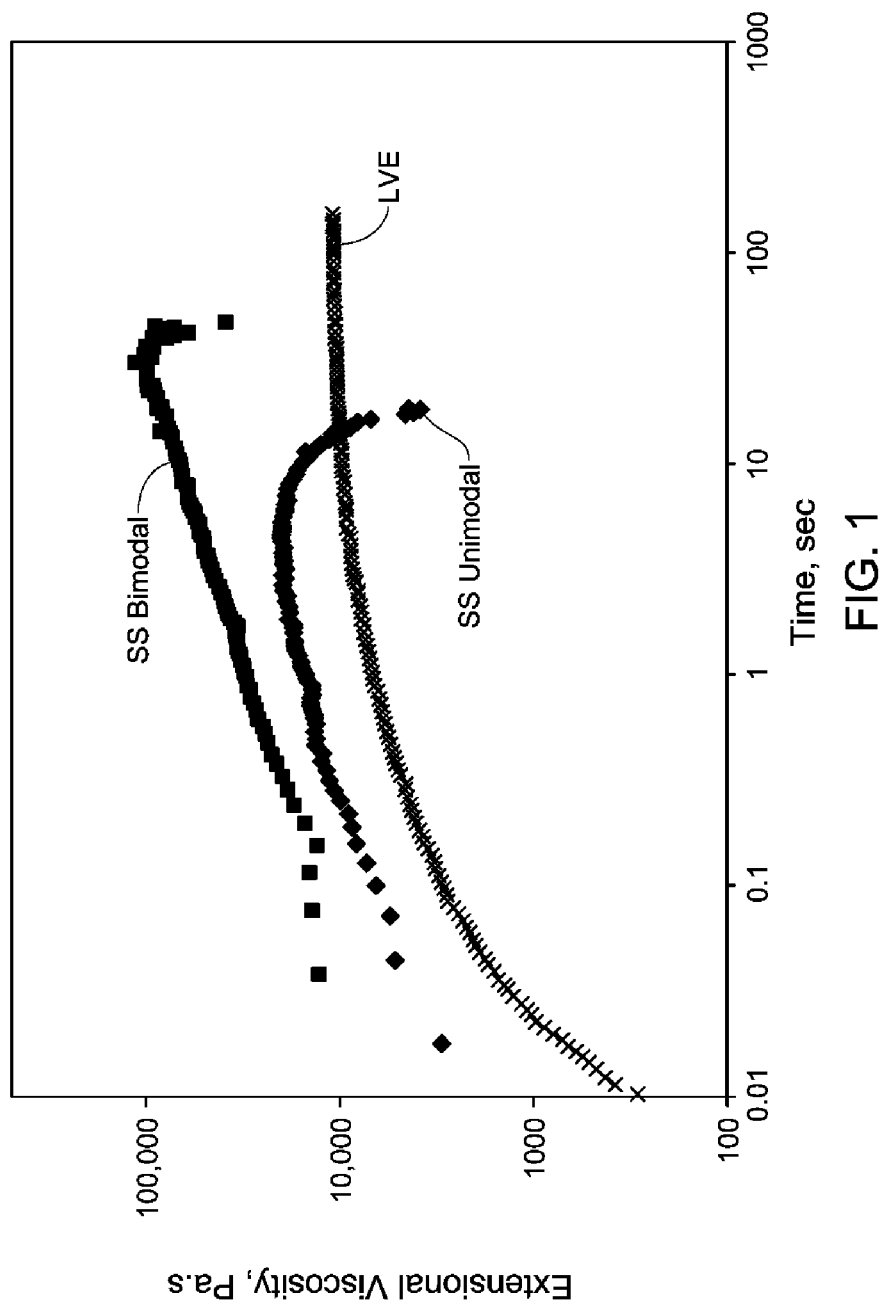
FIG. 1 is a series of plots of extensional viscosity of melt blended polypropylene compositions and base material of HMW polypropylene.

The present invention describes polypropylene compositions comprising at least one high molecular weight HMW polypropylene component and at least one low molecular weight LMW polypropylene component, wherein the polypropylene composition has any one or more of the following features: a) an extensional viscosity of the polypropylene composition is more than 10,000 Pa·s, when measured on an extensional rheometer at a temperature of 172° C., and an extensional rate of 10 second$^{-1}$ measured at 0.3 seconds; b) a zero shear viscosity of the polypropylene composition no less than the zero shear viscosity of the HMW polypropylene component alone, as determined in accordance with Small Angle Oscillatory Shear (SAOS) Rheology Test; and/or c) a relaxation time of the polypropylene composition of more than 0.9 seconds, as determined in accordance with Small Angle Oscillatory Shear (SAOS) Rheology Test; wherein the HMW polypropylene component has a z-average molecular weight Mz of more than 400,000 g/mole, as determined by Gel Permeation Chromatography (GPC), and is in an amount in the range of from 80.0 wt % to 99.9 wt %, based on the total weight of the composition. And thus the polypropylene compositions exhibit improved melt strength and rheological properties that can be translated to superior processability.

Here and throughout, "bimodal" means that the claimed compositions have at least two polymer components having a weight average molecular weight (Mw) different by at least 100,000 g/mole (as referred to herein "$\Delta M_w$") as measured by GPC described herein, but is not limited to compositions demonstrating two or more visible peaks or humps in the curve generated by the chromatograph. Most preferably, these compositions achieve the desired properties with substantially no fillers (less than 0.1 wt % fillers) and substantially no nucleating agents (less than 10 ppm).

Such compositions are attained by choosing polypropylenes, preferably polypropylenes formed from metallocene catalysts as described herein, which allow variability in the molecular weight, and/or ensuring intimate mixing of components using efficient compounding protocols.

The inventive compositions comprise at least two components: a high molecular weight (HMW) polypropylene component and a low molecular weight (LMW) polypropylene component. Each of the HMW and LMW polypropylenes preferably has any one or more of the features as described above, but is particularly characterized by its molecular weight characteristics.

In any embodiment, the HMW polypropylene component has a z-average molecular weight (Mz) of 400,000 g/mole or more, or within a range from 600,000 g/mole to 1,000,000, or 3,000,000, or 5,000,000, or 7,000,000, or 10,000,000 g/mole. The HMW polypropylene component in any embodiment has a weight average molecular weight (Mw) of 300,000 g/mole or more, or within a range from 400,000 g/mole to 800,000, or 1,200,000, or 1,600,000, or 2,000,000, or 2,400,000 g/mole. The HMW polypropylene component in any embodiment has an MFR within a range from 0.1, or 0.2, or 0.3, or 0.4, or 0.5, or 0.6, or 0.7, or 0.8, or 0.9 g/10 min to 1.0, or 2.0, or 3.0, or 4.0, or 5.0, or 6.0, or 7.0, or 8.0, or 9.0 or 10.0 g/10 min, preferably within a range from 0.5 to 5.0 g/10 min, as determined in accordance with ASTM D1238 (230° C., 2.16 kg).

In any embodiment, the LMW polypropylene component has a Mw of 300,000 g/mole or less, or within a range from 50,000, or 80,000 g/mole to 200,000, or 300,000 g/mole. The LMW polypropylene in any embodiment has an MFR within a range from 10, or 15 or 20 g/10 min to 80, or 100, or 160, or 200, or 500, or 1000 g/min, as determined in accordance with ASTM D1238 (230° C., 2.16 kg).

Not readily knowing the molecular weight characteristics of the PP components of a blend, especially the $\Delta Mw$, the deconvolution of the GPC data from bimodal polypropylene compositions and subsequent mathematical fitting can allow for calculation of individual molecular weights of the components. The molecular weight properties as characterized by GPC can be described by a log Normal function in which the probability density function (PDF) is shown in Equation 1:

$$f(M) = \frac{dWt}{d\log M} = \frac{1}{\sqrt{2\pi}\,\sigma} e^{-\frac{1}{2}\left(\frac{\log(M/M_p)}{\sigma}\right)^2} \qquad (1)$$

where the peak width σ and the peak molecular weight ($M_p$) are the parameters necessary for specific calculations.

In any embodiment, a HMW polypropylene component is within a range from 80.0 wt % to 99.9 wt %, or within a range from 85.0 wt % to 95.0 wt %, based upon the total weight of the composition, to form the inventive polypropylene composition.

In a preferred embodiment, the polypropylene composition comprises a HMW polypropylene component having a z-average molecular weight (Mz) of 400,000, 800,000 1,200,000 g/mole or more, and a MWD within a range from 2.0 to 5.0.

In another preferred embodiment, the polypropylene composition comprises a LMW polypropylene component having a weight average molecular weight (Mw) of 300,000, 200,000 g/mole or less, and a MWD within a range from 2.0 to 5.0.

In another preferred embodiment, the difference in Mw between the HMW PP component and the LMW PP component is at least 100,000, or 200,000, or 300,000 g/mol.

In any embodiment, the combined average molecular weight ($Mw_{compositions}$) of the polypropylene composition is within a range from 100,000, or 150,000, or 200,000, g/mole to 250,000, or 300,000, or 350,000, or 400,000, or 450,000 g/mole. In any embodiment, the combined MWD ($Mw_{compositions}/Mn_{compositions}$) of the polypropylene composition ($MWD_{compositions}$) is within a range from 3.0, or 3.5, or 4.0, or 5.0 to 12.0, or 16.0, or 18.0, or 20.0.

In any embodiment, the extensional viscosity of the polypropylene compositions is more than 10,000 Pa·s, preferably 15,000, 20,000, 25,000, 30,000 Pa·s, when measured on an extensional rheometer at a temperature of 172° C., and an extensional rate of 10 second$^{-1}$ measured at 0.3 seconds.

In any embodiment, the zero shear viscosity of the polypropylene compositions is at least 10, 20, 30, 40, 50, 60, 70, 80, 90, or 100% higher than the zero shear viscosity of the HMW polypropylene component alone, as determined in accordance with SAOS Rheology Test.

In any embodiment, the zero shear viscosity of the polypropylene compositions is more than 15,000, 17,000, 19,000, 21,000, 23,000, 25,000, 27,000, or 29,000 Pa·s, as determined in accordance with SAOS Rheology Test.

In any embodiment, the relaxation time of the polypropylene compositions of more than 0.9 seconds, preferably 1.2, or 1.5, or 1.8, or 2.1, or 2.4 or more seconds, as determined in accordance with Small Angle Oscillatory Shear (SAOS) Rheology Test, but preferably no more than 4, or 6, or 8, or 10 seconds.

The polypropylene compositions have certain DSC measured properties. In any embodiment, the polypropylene composition has a Heat Deflection Temperature (HDT) of greater than 95, or 98, or 100, or 102° C.; or within a range from 95 to 110° C. In any embodiment, the polypropylene composition has a melting point temperature $T_{m2}$ of less than 165, or 160° C., or within a range from 150, or 152° C. to 158, or 160, or 165° C.

The polypropylene compositions may include, or be combined with, other desirable ingredients which are useful in forming articles of manufacture. Useful ingredients that can be combined with the inventive polypropylene compositions (or the polymers used to make the polypropylene compositions) include fillers such as talc, calcium carbonate, silica, alumina, mica, glass fibers, carbon fibers, titanium dioxide; and metal salts of an oxysulfate, aluminoxysulfate, aluminosilicate, silicate, borate, or combinations thereof; any of which can have an aspect ratio from 1 to 10, or 20, or 100 or more.

In any embodiment, articles of manufacture can be formed from the polypropylene compositions disclosed herein, which may or may not include the other additives and components mentioned above. Desirable articles include thermoformed articles, injection molded articles, and/or blow molded articles, any of which may be foamed or non-foamed. Useful articles include automotive components, both interior and exterior, appliance components, and food containers such as cups, plates, and so-called "clamshell" food containers such as disclosed in U.S. Pat. No. 8,883,280, among many other articles.

The various descriptive elements and numerical ranges disclosed herein for the inventive process and polypropylene compositions can be combined with other descriptive elements and numerical ranges to describe the invention(s); further, for a given element, any upper numerical limit can be combined with any lower numerical limit described herein, including the examples in jurisdictions that allow such ranges. The features of the invention are demonstrated in the following non-limiting examples.

High Molecular Weight (HMW) Polypropylene Component

The inventive compositions comprise at least two components, wherein the HMW polypropylene component has a z-average molecular weight (Mz) of 400,000 g/mole or more, or within a range from 600,000 g/mole to 1,000,000, or 3,000,000, or 5,000,000, or 7,000,000, or 10,000,000 g/mole. The HMW polypropylene component in any embodiment has an MFR within a range from 0.1, or 0.5 g/10 min to 3, or 4, or 5 g/10 min, as determined in accordance with ASTM D1238 (230° C., 2.16 kg).

The HMW polypropylene component may be unimodal polypropylenes formed from metallocene catalyst compounds. The metallocene catalyst compounds useful herein include those catalyst compounds represented by the formula:

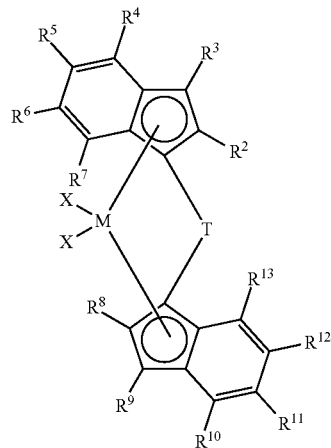

where:
M is a group 4 metal (preferably Hf, Ti, Zr, preferably Hf or Zr);
T is a bridging group;
X is an anionic leaving group, most preferably a halogen or C1 to C10 alkyl group;
each $R^2$, $R^3$, $R^5$, $R^6$, $R^7$, $R^8$, $R^9$, $R^{11}$, $R^{12}$, and $R^{13}$ is independently, halogen atom, hydrogen, a hydrocarbyl, substituted hydrocarbyl, halocarbyl, substituted halocarbyl, silylcarbyl, substituted silylcarbyl, germylcarbyl, substituted germylcarbyl substituents or a —NR'$_2$, —SR', —OR', —OSiR'$_3$, or —PR'$_2$ radical, wherein R' is one of a halogen atom, a C1 to C10 alkyl group, or a C6 to C10 aryl group; most preferably $R^2$ and $R^8$ are C3 to C6 cyclic alkanes; and
$R^4$ and $R^{10}$ are phenyl groups substituted at the 3' and 5' positions, preferably C2 to C6 alkyls, and most preferably branched alkyls.

In a preferred embodiment of the invention, M is Hf or Zr; T is represented by the formula, (R*$_2$G)$_g$, where each G is C, Si, or Ge, g is 1 or 2, and each R* is, independently, hydrogen, halogen, C1 to C20 hydrocarbyl, or a C1 to C20 substituted hydrocarbyl, and two or more R* can form a cyclic structure including aromatic, partially saturated, or saturated cyclic or fused ring system; X is an anionic leaving group; each $R^3$, $R^5$, $R^6$, $R^7$, $R^9$, $R^{11}$, $R^{12}$, and $R^{13}$ is independently, hydrogen, a hydrocarbyl, substituted hydrocarbyl, halocarbyl, substituted halocarbyl, silylcarbyl, substituted silylcarbyl, germylcarbyl, or substituted germylcarbyl substituents.

In any embodiment of any formula described herein, M is Zr or Hf.

In any embodiment of any formula described herein, each X is, independently, selected from the group consisting of C1 to C20 hydrocarbyl radicals, hydrides, amides, alkoxides, sulfides, phosphides, halides, dienes, amines, phosphines, ethers, and a combination thereof, (two X's may form a part of a fused ring or a ring system), preferably each X is independently selected from halides and C1 to C5 alkyl groups, preferably each X is a methyl group.

In a preferred embodiment of the invention in any embodiment of any formula described herein, each $R^3$, $R^5$, $R^6$, $R^7$, $R^9$, $R^{11}$, $R^{12}$, or $R^{13}$ is, independently, hydrogen or a substituted hydrocarbyl group or unsubstituted hydrocarbyl group, or a heteroatom, preferably hydrogen, methyl, ethyl, propyl, butyl, pentyl, hexyl, or an isomer thereof.

In a preferred embodiment of any formula described herein, each $R^3$, $R^5$, $R^6$, $R^7$, $R^9$, $R^{11}$, $R^{12}$, or $R^{13}$ is, independently selected from hydrogen, methyl, ethyl, phenyl, benzyl, cyclobutyl, cyclopentyl, cyclohexyl, naphthyl, anthracenyl, carbazolyl, indolyl, pyrrolyl, cyclopenta[b]thiophenyl, fluoro, chloro, bromo, iodo and isomers of propyl, butyl, pentyl, hexyl, heptyl, octyl, nonyl, decyl, methylphenyl, dimethylphenyl, ethylphenyl, diethylphenyl, propylphenyl, dipropylphenyl, butylphenyl, dibutylphenyl, methylbenzyl, methylpyrrolyl, dimethylpyrrolyl, methylindolyl, dimethylindolyl, methylcarbazolyl, dimethylcarbazolyl, and methylcyclopenta[b]thiophenyl dimethylcyclopenta[b]thiophenyl.

In a preferred embodiment of the invention in any embodiment of any formula described herein, T is a bridging group and comprises Si, Ge, or C center having one or more (as the valency requires) hydrocarbyl groups, preferably T is dialkyl silicon or dialkyl germanium, preferably T is dimethyl silicon.

In a preferred embodiment of the invention in any embodiment of any formula described herein, each $R^2$ and $R^8$, is independently, a C1 to C20 hydrocarbyl, or a C1 to C20 substituted hydrocarbyl, C1 to C20 halocarbyl, C1 to C20 substituted halocarbyl, C1 to C20 silylcarbyl, C1 to C20 substituted silylcarbyl, C1 to C20 germylcarbyl, or C1 to C20 substituted germylcarbyl substituents. Preferably, each $R^2$ and $R^8$, is independently, methyl, ethyl, propyl, butyl, pentyl, hexyl, heptyl, octyl, nonyl, decyl, undecyl, docedyl or an isomer thereof, preferably cyclopropyl, cyclohexyl, (1-cyclohexyl methyl) methyl, isopropyl, and the like.

Examples of aryl and substituted aryl groups include phenyl, naphthyl, anthracenyl, 2-methylphenyl, 3-methylphenyl, 4-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2,4,5-trimethylphenyl, 2,3,4,5,6-pentamethylphenyl, 2-ethylphenyl, 3-ethylphenyl, 4-ethylphenyl, 2,3-diethylphenyl, 2,4-diethylphenyl, 2,5-diethylphenyl, 2,6-diethylphenyl, 3,4-diethylphenyl, 3,5-diethylphenyl, 3-isopropylphenyl, 4-isopropylphenyl, 3,5-diisopropylphenyl, 2,5-di-isopropylphenyl, 2-tert-butylphenyl, 3-tert-butylphenyl, 4-tert-butylphenyl, 3,5-di-tert-butylphenyl, 2,5-di-tert-butylphenyl, carbazolyl, indolyl, pyrrolyl, and cyclopenta[b]thiophenyl. Preferred aryl groups include phenyl, benzyl, carbozyl, naphthyl, and the like.

In a preferred embodiment of the invention in any embodiment of any formula described herein, $R^2$ and $R^8$ are a C1 to C20 hydrocarbyl, such as methyl, ethyl, propyl, butyl, pentyl, hexyl, heptyl, octyl, nonyl, decyl, undecyl, docedyl or an isomer thereof, preferably cyclopropyl, cyclohexyl, (1-cyclohexyl methyl) methyl, or isopropyl; and $R^4$ and $R^{10}$ are independently selected from phenyl, naphthyl, anthracenyl, 2-methylphenyl, 3-methylphenyl, 4-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2,4,5-trimethylphenyl, 2,3,4,5,6-pentamethylphenyl, 2-ethylphenyl, 3-ethylphenyl, 4-ethylphenyl, 2,3-diethylphenyl, 2,4-diethylphenyl, 2,5-diethylphenyl, 2,6-diethylphenyl, 3,4-diethylphenyl, 3,5-diethylphenyl, 3-isopropylphenyl, 4-isopropylphenyl, 3,5-diisopropylphenyl, 2,5-di-isopropylphenyl, 2-tert-butylphenyl, 3-tert-butylphenyl, 4-tert-butylphenyl, 3,5-di-tert-butylphenyl, 2,5-di-tert-butylphenyl, cyclopropyl, cyclobutyl, cyclopentyl, cyclohexyl, carbazolyl, indolyl, pyrrolyl, and cyclopenta[b]thiophenyl. In a preferred embodiment, $R^2$, $R^8$, $R^4$, and $R^{10}$ are as described in the preceding sentence and $R^3$, $R^5$, $R^6$, $R^7$, $R^9$, $R^{11}$, $R^{12}$, and $R^{13}$ are hydrogen.

Metallocene catalyst compounds that are particularly useful in this invention include one or more of:
dimethylsilyl bis(2-cyclopropyl,4-(3',5'-di-t-butylphenyl)indenyl)ZrCl$_2$;
dimethylsilyl bis(2-cyclopropyl,4-(3',5'-di-t-butylphenyl)indenyl)HfCl$_2$;
dimethylsilyl bis(2-cyclopropyl,4-(3',5'-di-t-phenylphenyl)indenyl)ZrCl$_2$;
dimethylsilyl bis(2-cyclopropyl,4-(3',5'-di-t-phenylphenyl)indenyl)HfCl$_2$;
dimethylsilyl bis(2-cyclopropyl,4-(3',5'-di-isopropylphenyl)indenyl)HfCl$_2$;
dimethylsilyl bis(2-cyclopropyl,4-(3',5'-di-isopropylphenyl)indenyl)ZrCl$_2$;
dimethylsilyl bis(2-cyclopropyl,4-(3',5'-di-methylphenyl)indenyl)HfCl$_2$;
dimethylsilyl bis(2-cyclopropyl,4-(3',5'-di-methylphenyl)indenyl)ZrCl$_2$;
dimethylsilyl bis(2-cyclopropyl,4-(3',5'-di-hexylphenyl)indenyl)HfCl$_2$;
dimethylsilyl bis(2-cyclopropyl,4-(3',5'-di-hexylphenyl)indenyl)ZrCl$_2$;
dimethylsilyl bis(2-cyclopropyl,4-(3',5'-di-n-butylphenyl)indenyl)HfCl$_2$; and
dimethylsilyl bis(2-cyclopropyl,4-(3',5'-di-t-butylphenyl)indenyl)ZrCl$_2$.
where, in alternate embodiments, the dichloride in any of the compounds listed above may be replaced with dialkyl (such as dimethyl), dialkaryl, diflouride, diiodide, or dibromide, or a combination thereof.

In a preferred embodiment of the invention, at least 50 wt %, preferably at least 60 wt %, at least 70 wt %, preferably at least 80 wt %, at least 90 wt % of the catalyst compound is in the rac form, based upon the weight of the rac and meso forms present, preferably from 60 to 100 wt %, preferably from 80 to 100 wt %, preferably from 90 to 100 wt %. In a preferred embodiment of the invention, the molar ratio of rac to meso in the catalyst compound is in the range of from 1:1 to 100:1, preferably 5:1 to 90:1, preferably 7:1 to 80:1, preferably 20:1 to 80:1, or 30:1 to 80:1, or 50:1 to 80:1.

In some embodiments, two or more different metallocene catalyst compounds are present in the catalyst system used herein. In some embodiments, two or more different metallocene catalyst compounds are present in the reaction zone where the process(es) described herein occur. When two transition metal compound based catalysts are used in one reactor as a mixed catalyst system, the two transition metal compounds should be chosen such that the two are compatible. A simple screening method such as by $^1$H or $^{13}$C NMR, known to those of ordinary skill in the art, can be used to determine which transition metal compounds are compatible. It is preferable to use the same activator for the transition metal compounds, however, two different activators, such as two non-coordination anions, a non-coordinating anion activator and an alumoxane, or two different alumoxanes can be used in combination. If one or more transition metal compounds contain an X ligand which is not a hydride, hydrocarbyl, or substituted hydrocarbyl, then the alumoxane (or other alkylating agent) is typically contacted with the transition metal compounds prior to addition of the non-coordinating anion activator.

The two transition metal compounds (pre-catalysts) may be used in any ratio. Preferred molar ratios of (A) transition metal compound to (B) transition metal compound fall within a range from (A:B) 1:1000 to 1000:1, alternatively 1:100 to 500:1, alternatively 1:10 to 200:1, alternatively 1:1 to 100:1, alternatively 1:1 to 75:1, and alternatively 5:1 to 50:1. The particular ratio chosen will depend on the exact pre-catalysts chosen, the method of activation, and the end product desired. In a particular embodiment, when using the two pre-catalysts, where both are activated with the same activator, useful mole percent, based upon the molecular weight of the pre-catalysts, are 10 to 99.9% A to 0.1 to 90% B, alternatively 25 to 99% A to 0.5 to 50% B, alternatively 50 to 99% A to 1 to 25% B, and alternatively 75 to 99% A to 1 to 10% B.

The "activators" are defined to be any compound which can activate any one of the metallocene catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract a reactive, σ-bound, metal ligand making the metal complex cationic and providing a charge-balancing noncoordinating or weakly coordinating anion.

In any embodiment, the catalyst compounds can be combined with at least one activator to effect polymerization of propylene monomer, wherein the activator preferably comprises a non-coordinating borate anion and a bulky organic cation. In a preferred embodiment, the non-coordinating borate anion comprises a tetra(perfluorinated C6 to C14 aryl)borate anion and substituted versions thereof; most preferably the non-coordinating borate anion comprises a tetra(pentafluorophenyl)borate anion or tetra(perfluoronaphthyl)borate anion.

Preferably the bulky organic cation is selected from the following structures (IVa) and (IVb):

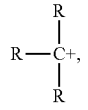

(IVa)

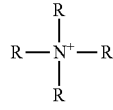

(IVb)

wherein each R group is independently hydrogen, a C6 to C14 aryl (e.g., phenyl, naphthyl, etc.), a C1 to C10, or C20 alkyl, or substituted versions thereof, most preferably halogen substituted; and more preferably at least one R group is a C6 to C14 aryl or substituted versions thereof.

In any embodiment, the bulky organic cation is a reducible Lewis Acid, especially a trityl-type cation (wherein each "R" group in (IVa) is aryl) capable of extracting a ligand from the catalyst precursor, where each "R" group is an C6 to C14 aryl group (phenyl, naphthyl, etc.) or substituted C6 to C14 aryl, and preferably the reducible Lewis acid is triphenyl carbenium and substituted versions thereof.

Also, in any embodiment, the bulky organic cation is a Brønsted acid capable of donating a proton to the catalyst precursor, wherein at least one "R" group in (IVb) is hydrogen. Exemplary bulky organic cations of this type in general include ammoniums, oxoniums, phosphoniums, silyliums, and mixtures thereof; preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo-N,N-dimethylaniline, and p-nitro-N,N-dimethylaniline; phosphoniums from triethylphosphine, triphenylphosphine, and diphenylphosphine; oxoniums from ethers, such as dimethyl ether diethyl ether, tetrahydrofuran, and dioxane; and sulfoniums from thioethers, such as diethyl thioethers and tetrahydrothiophene, and mixtures thereof.

The catalyst compound preferably reacts with the activator upon their combination to form a "catalyst" or "activated catalyst" that can then effect the polymerization of monomers. The catalyst may be formed before combining with monomers, after combining with monomers, or simultaneous therewith.

The HMW polypropylene component may be formed through the following polymerization process: 1) contacting propylene with a catalyst system comprising an activator and a metallocene catalyst compound as described herein; 2) polymerizing the propylene for a time period; and 3) obtaining the HMW polypropylene component. In a preferred embodiment, a lower amount of hydrogen than in the prior polymerization step to no hydrogen is added into the polymerization process after the time period of step 2).

If the polymerization is carried out as a suspension or solution polymerization, an inert solvent may be used, for example, the polymerization may be carried out in suitable diluents/solvents. Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated C4 to C10 alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably less than 0.1 wt % based upon the weight of the solvents. It is also possible to use mineral spirits or a hydrogenated diesel oil as a solvent. Toluene may also be used. The polymerization is preferably carried out in the liquid monomer(s). If inert solvents are used, the monomer(s) is (are) typically metered in gas or liquid form.

In a preferred embodiment, the feed concentration of the monomers for the polymerization is 60 vol % solvent or less, preferably 40 vol % or less, or preferably 20 vol % or less, based on the total volume of the feedstream. Preferably, the polymerization is run in a bulk process.

Preferred polymerizations can be run at any temperature and/or pressure suitable to obtain the desired polymers. Typical temperatures and/or pressures include a temperature greater than 30° C., preferably greater than 50° C., preferably greater than 65° C., preferably greater than 70° C., preferably greater than 75° C., alternately less than 300° C., preferably less than 200° C., preferably less than 150° C., most preferred less than 140° C.; and/or at a pressure in the range of from 100 kPa to 20 MPa, about 0.35 MPa to about 10 MPa, preferably from about 0.45 MPa to about 6 MPa, or preferably from about 0.5 MPa to about 5 MPa.

In an embodiment of the invention, little or no scavenger is used in the polymerization to produce the polymer, i.e., scavenger (such as trialkyl aluminum) is present at zero mol %, alternately the scavenger is present at a molar ratio of scavenger metal to transition metal of less than 100:1, preferably less than 50:1, preferably less than 15:1, preferably less than 10:1.

Other additives may also be used in the polymerization, as desired, such as one or more scavengers, promoters, modifiers, chain transfer agents (such as diethyl zinc), reducing agents, oxidizing agents, hydrogen, aluminum alkyls, or silanes.

In a preferred embodiment of the invention, the polymerization occurs in a supercritical or supersolution state as described in U.S. Pat. No. 7,812,104, incorporated by reference.

In an embodiment of the invention, the productivity of the catalyst system is at least 50 grams polymer/grams catalyst/hour, preferably 500 or more g polymer/g (cat)/hour, preferably 5000 or more g polymer/g (cat)/hour, preferably 50,000 or more g polymer/g (cat)/hour.

In an embodiment of the invention, the activity of the catalyst system is at least 50 kilograms polymer/mole catalyst, preferably 500 or more kgP/molcat, preferably 5000 or more kgP/mol cat, preferably 50,000 or more kgP/molcat.

Low Molecular Weight (LMW) Polypropylene Component

The low molecular weight (LMW) polypropylene component of the inventive compositions has any one or more of the features as described above, but is particularly characterized by its molecular weight characteristics.

In any embodiment, the LMW polypropylene component has a Mw of 300,000 g/mole or less, or within a range from 50,000, or 80,000 g/mole to 200,000, or 300,000 g/mole. The LMW polypropylene in any embodiment has an MFR within a range from 10, or 15 or 20 g/10 min to 80, or 100, or 160, or 200, or 500, or 1000 g/10 min.

The LMW polypropylene component of the inventive propylene compositions may be unimodal polypropylenes made from any type of catalyst, and desirable unimodal polypropylenes have the features described herein. The LMW polypropylene component is preferably formed using single-site catalysts (ssPP). Many organometallic compounds are known as useful single-site catalysts such as metallocenes, pyridiyldiamide transition metal catalysts, alkoxide and/or amide transition metal catalysts, bis(imino) pyridyl transition metal catalysts, and many other organometallic compounds useful in polyolefin catalysis known in the art. These compounds are accompanied by activator compounds such as methylalumoxane or boron activators, especially perfluorinated aryl compounds. Together, these and other organometallic compounds known in the art form the "single-site catalysts," such as reviewed by H. Kaneyoshi et al., "Nonmetallocene single-site catalysts for polyolefins" in RESEARCH REVIEW (McGraw Hill, 2009); C. De Rosa et al. "Single site metalorganic polymerization catalysis as a method to probe the properties of polyolefins" in 2 POLYM. CHEM. 2155 (2012); I. E. Sedov et al. "Single-site catalysts in the industrial production of polyethylene," 4(2) CATALYSIS IN INDUSTRY 129-140 (2012); and G. W. Coates, "Precise control of polyolefin stereochemistry using single-site metal catalysts," 100 CHEM. REV. 1223 (2000). Such catalysts can be used in any desirable process such as a solution, slurry, or gas phase process.

Regardless of the catalyst used to make the LMW propylene component, useful polypropylenes will have certain desirable properties. In any embodiment, the polypropylenes have a molecular weight distribution (Mw/Mn) within a range from 2.0, or 2.5 to 3.0, or 3.5, or 4.0, or 4.5, or 5.0. Also, in any embodiment, the polypropylenes have a melt flow rate (MFR, ASTM D1238, 2.16 kg, 230° C.) within a range from 10, or 20, or 30, or 40, or 50, or 80, to 100, or 150, or 200, or 250, or 300, or 400, or 500, or 600, or 800, or 1000, or 1200, or 1400, or 1600, or 2000 g/10 min. In any embodiment, desirable polypropylenes have a melting point temperature ($T_{m2}$) within a range from 140, or 145, or 150° C. to 155, or 160, or 165, or 170° C. Also, in any embodiment the desirable polypropylenes will have an isotacticity as measured by $^{13}$C-NMR of greater than 80, or 85, or 90, or 95, or 98, or 99%.

In any embodiment, useful polypropylenes are either homopolymers of propylene-derived units or copolymers comprising within a range from 0.1, or 0.2, or 0.5 wt % to 2, or 3, or 4, or 5 wt % by weight of the polypropylene copolymer, of ethylene or $C_4$ to $C_{12}$ α-olefin derived units, the remainder being propylene-derived units. Preferable polypropylenes are polypropylene homopolymers, most preferably isotactic polypropylene homopolymers having features as described above.

Process of Blending

At least two components of the unimodal polypropylenes as described above are melt blended to form the inventive polypropylene compositions. In a preferred embodiment, the two unimodal polypropylenes are melt blended. By "melt blend" what is meant is that the blending or combining of at least two polypropylenes is performed ex situ, that is, outside of the polymerization reactor used to make the individual polypropylene components, and in particular, refers to combining the unimodal polypropylenes in a manner to impart heat and/or shear forces to intimately blend the unimodal polypropylenes at a temperature at least high enough to melt the highest melting polypropylene such as by a single- or twin-screw extrusion process. Thus, disclosed in any embodiment is a process to form the preferably bimodal polypropylene compositions which comprise combining at least two unimodal polypropylenes in at least one single pass extrusion, and forming a bimodal polypropylene composition having the features described herein.

The single pass extrusion comprises combining within a range from 80.0 wt % to 99.9 wt % (based upon the total weight of the composition) of a HMW polypropylene component with within a range from 20.0 wt % to 0.1 wt % (based upon the total weight of the composition) of a LMW polypropylene component, and melt blending in a melt blending step the HMW polypropylene and LMW polypropylene components, where the extruder preferably has at least three temperature zones each independently at a melt temperature ($T_{melt}$) within a range from 300, or 320, or 340° C. to 360, or 380, or 400, or 420, or 440, or 460° C.; and isolating or forming the blend produced in the melt blending step to produce the polypropylene composition.

In any embodiment, the melt blending takes place in an extruder having a feeder zone (first 10% of the length of the extruder from the feeder where the polymer enters the extruder) and a die zone (last 10% of the length of the extruder before the point where the polymer exits the die), wherein a temperature gradient is provided from a feeder zone to a die zone of at least +5, or +10, or +20° C. In any embodiment, the melt blending takes place at a melt temperature ($T_{melt}$) within a range from 350, or 360, or 370° C. to 380, or 390, or 400, or 410, or 420, or 430, or 440, or 450° C. Preferably the $T_{melt}$ at the feeder zone is within a range from 350 to 400° C., and the $T_{melt}$ at the die zone is within a range from 370 to 420° C. Preferably, the extruder has at least three temperature zones where each is independently controllable within the temperature ranges described herein.

In a preferred embodiment, the invention encompasses a process to form a polypropylene composition comprising at least one HMW polypropylene component within a range from 80.0 wt % to 99.9 wt %, based on the total weight of the composition, and at least one LMW polypropylene component in at least one single pass extrusion, which process comprises: a) combining the HMW polypropylene component having a z-average molecular weight Mz of 400,000 g/mole or more, with the LMW polypropylene component; b) melt blending in an extruder the components in step a) at a melt temperature within a range from 350° C. to 450° C.; and c) isolating the blend produced in step b) resulting in the production of the polypropylene composition.

The inventive process described herein may include, in any embodiment, the further step to make an article of manufacture, such as thermoformed articles, injection molded articles, or blow molded articles, foamed or non-foamed, comprising polypropylene compositions herein.

Further, at any time before or after melt blending, antioxidants, especially so called primary and secondary antioxidants, as well as alkyl radical scavengers, and acid scavengers can be added to the melt blended polypropylene compositions or mixture of polymers used to make the melt blended polypropylene compositions to within a range from 10, or 20, or 50 ppm to 400, or 600, or 1000, or 2000, or 3000 ppm for each.

The following description includes test methods used here and in the claims.

Test Methods

Melt Flow Rate (MFR).

MFR is defined in grams of polymer per 10 min (g/10 min or its equivalent unit dg/min) and was measured according to ASTM D1238 (2.16 kg, 230° C.). For reactor granule and/or powder PP samples that are not stabilized, the following sample preparation procedure is followed before measuring the MFR. A solution of butylated hydroxy toluene (BHT) in hexane is prepared by dissolving 40±1 grams of BHT into 4000±10 ml of hexane. Weigh 10±1 grams of the granule/powder PP sample into an aluminum weighing pan. Add 10±1 ml of the BHT/hexane solution into the aluminum pan under a hood. Stir the sample, if necessary, to thoroughly wet all the granules. Place the sample slurry in a vacuum oven at 105°±5° C. for a minimum of 20 min Remove the sample from the oven and place in a nitrogen purged desiccator a minimum of 15 minutes allowing the sample to cool. Measure the MFR following ASTM D1238 procedure.

Melting Point Temperature ($T_{m2}$).

In any embodiment of the invention, the polypropylene components described herein may have a melting point (DSC second melt) as described below, and reported in Table 1. Melting temperature ($T_{m2}$) was measured using Differential Scanning calorimetry (DSC) using commercially available equipment such as a TA Instruments 2920 DSC. Typically, 6 to 10 mg of the sample, that has been stored at room temperature for at least 48 hours, is sealed in an aluminum pan and loaded into the instrument at 23° C. The sample is equilibrated at 25° C., then it is cooled at a cooling rate of 10° C./min to −80° C., to obtain heat of crystallization (Tc). The sample is held at −80° C. for 5 min and then heated at a heating rate of 10° C./min to 25° C. The glass transition temperature (Tg) is measured from the heating cycle. Otherwise, the sample is equilibrated at 25° C., then heated at a heating rate of 10° C./min to 150° C. The endothermic melting transition, if present, is analyzed for onset of transition and peak temperature. The melting temperatures reported ($T_{m2}$) are the peak melting temperatures from the second heat unless otherwise specified. For samples displaying multiple peaks, the melting point (or melting temperature) is defined to be the peak melting temperature (i.e., associated with the largest endothermic calorimetric response in that range of temperatures) from the DSC melting trace. The $T_{m2}$ is measured to within ±0.2° C.

Molecular Weight Characteristics.

The molecular weight properties (Mz, Mw, Mn, Mw/Mn, etc.) were determined with a high temperature Gel Permeation Chromatography (PolymerChar GPC-IR) equipped with a multiple-channel band filter based Infrared detector ensemble IR5, in which a broad-band channel is used to measure the polymer concentration while two narrow-band channels were used for characterizing composition. Three Agilent PLgel 10 μm mixed-B LS columns were used to provide polymer separation. Aldrich reagent grade 1,2,4-trichlorobenzene (TCB) with 300 ppm antioxidant butylated hydroxytoluene (BHT) was used as the mobile phase. The TCB mixture was filtered through a 0.1 μm Teflon filter and degassed with an online degasser before entering the GPC instrument. The nominal flow rate was 1.0 mL/min and the nominal injection volume was 200 μL. The whole system including transfer lines, columns, detectors were contained in an oven maintained at 145° C. A given amount of polymer sample was weighed and sealed in a standard vial with 10 μL flow marker (heptane) added to it. After loading the vial in the autosampler, polymer was automatically dissolved in the instrument with 8 mL added TCB solvent. The polymer was dissolved at 160° C. with continuous shaking for about 1 hour for most PE samples or 2 hours for PP samples. The TCB densities used in concentration calculation were 1.463 g/ml at room temperature (22° C.) and 1.284 g/ml at 145° C. The sample solution concentration was from 0.2 to 2.0 mg/ml, with lower concentrations being used for higher molecular weight samples. The MWD values can be determined to ±0.05.

The concentration, c, at each point in the chromatogram was calculated from the baseline-subtracted IR5 broadband signal, I, using the following equation:

$$c = \alpha I$$

where α is the mass constant determined with PE or PP standards. The mass recovery is calculated from the ratio of the integrated area of the concentration chromatography over elution volume and the injection mass which is equal to the pre-determined concentration multiplied by injection loop volume.

The molecular weight was determined by combining the universal calibration relationship with the column calibration, which was performed with a series of monodispersed polystyrene (PS) standards. The MW was calculated at each elution volume with the following equation:

$$\log M_X = \frac{\log(K_X/K_{PS})}{a_X + 1} + \frac{a_{PS} + 1}{a_X + 1} \log M_{PS}$$

where the variables with subscript "X" stand for the test sample while those with subscript "PS" stand for "polystyrene" sample. In this method, $a_{PS}=0.67$ and $K_{PS}=0.000175$ while $a_X$ and $K_X$ were obtained from published literature. Specifically, a/K=0.695/0.000579 for polyethylene homopolymer and 0.705/0.0002288 for polypropylene homopolymer.

The universal calibration method was used for determining the molecular weight distribution (MWD, Mw/Mn) and molecular-weight averages (Mn, Mw, Mz, etc.) of eluting polymer fractions. Thirteen narrow molecular-weight distribution polystyrene standards (obtained from Polymer Labs, UK) within a range from 1.5-8200 kg/mol were used to generate a universal calibration curve. Mark-Houwink parameters were obtained from Appendix I of Mori, S.; Barth, H. G. Size Exclusion Chromatography, (Springer, 1999). For polystyrene $K=1.38\times10^{-4}$ dl/g and $\alpha=0.7$; and for polyethylene $K=5.05\times10^4$ dl/g and $\alpha=0.693$ were used. For a polymer fraction, which eluted at a temperature step, that has a weight fraction (weight % recovery) of less than 0.5%, the MWD and the molecular weight averages were not computed; additionally, such polymer fractions were not included in computing the MWD and the molecular-weight averages of aggregates of fractions.

Small Angle Oscillatory Shear (SAOS) Rheology.

Sample preparation for small amplitude oscillatory shear (SAOS) test is as follows. The specimen was compression molded from granules on hot press manufacture by LAB Tech Engineering Company Ltd. Granules were compressed at 190° C., 292 N for 8 min after 5 min preheat by using 1 mm thick molds with five 25 mm diameter cavities.

SAOS Rheology Test.

SAOS Rheology test was tested on ARES-G2 Rheometer, produced by TA Instruments Co. Ltd. Specimens were loaded between parallel-plates geometry after ARES was preheated at 210° C. Specimen thickness was adjusted by the gap between upper and lower plates to about 1 mm Strain sweep (SS) test was conducted before SAOS test on the same equipment to determine critical strain value from linear viscoelastic region. In SS test, specimen was tested at 210° C. with 25 mm diameter parallel plates geometry at angular frequency $(\omega)=1.0$ rad/s, strain $(\dot{\gamma})=1\%$ to 10%. Then SAOS test was conducted at 210° C., 195° C., 180° C., 165° C., 150° C., and 135° C., respectively. Strain $(\dot{\gamma})$ was kept low (<10%) to test within the linear viscoelastic region according to SS result. Frequency was varied between 100 rad/s and 0.1 rad/s with 5 points per decade. All tests were carried in a nitrogen atmosphere to avoid oxidative degradation. Master curves are compared under 165° C. after Time Temperature Superposition.

Time Temperature Superposition (TTS).

TTS is used to describe the relaxation of polymer chains at high temperature that can be achieved at low temperature as long as it is given a long enough time to relax. By this method temperature dependent flow behavior can be transformed into frequency dependent behavior, thus the frequency regime of studied material is expanded (see Van Gurp, M. et al. 67(1) Rheol. Bull. 5-8 (1998)). TTS was performed using the software TRIOS provided by TA Instruments Co. Ltd. When starting the TTS function, the reference temperature was set to 165° C. in this study. Plots of complex viscosity ($\eta^*$) against angular frequency ($\omega$) curves at different temperatures were shifted horizontally to an overlaid master curve. Activation energy was calculated from shifting factors fitted by Arrhenius equation (see Vega, J. F., et al. 31(11) Macromolecules 3639-3647 (1998)):

$$a_T = \exp\left[\frac{E_a}{R}\left(\frac{1}{T} - \frac{1}{T_r}\right)\right]$$

where $\alpha_T$ is horizontal shifting factor, R is the Universal gas constant, Ea is flow activation energy, T is testing temperature in Kelvin degree, $T_r$ is reference temperature in Kelvin degree. The master curve was shifted to 190° C. after the activation energy is calculated. Then it is transformed into master curve of shear viscosity ($\eta$) against shear rate ($\dot{\gamma}$) according to Cox-Merz rule: $\eta(\dot{\gamma})=\eta^*(\omega)$ when $\dot{\gamma}=\omega$.

Calculation of Master Curve.

Zero shear viscosity, relaxation time and power law index were calculated from master curve by curve fitting to Cross Model (see Rao, M. A. in Food Engineering Series: Rheology of Fluid, semisolid, and solid foods, (Springer, US, 3rd ed. 2014)):

$$(\eta-\eta_j)/(\eta_o-\eta_j)=1/(1+k\dot{\gamma})^n$$

wherein $\eta_0$ is zero shear viscosity (Pa·s); k is relaxation time (s); n is the (−1) power law index; and $\eta_i$ is infinite viscosity (Pa·s), which is equal to zero in this study. These parameters are used to evaluate shear thinning behavior of polymer melt. The first plateau in a plot of Log (apparent viscosity) as a function of Log (shear rate), which is a reversed S-shaped curve, in the low shear rate region is a Newtonian plateau where viscosity is independent to shear rate. The corresponding viscosity is $\eta_o$. In this region, the polymer chains are entangled and resistant to shear flow since there is only little rearrangement of polymer chain. Then a shear thinning region is observed that viscosity is decreased with shear rate, indicating polymer chains begin to orient and disentangle at the flow direction. When shear rate is high enough, second Newtonian plateau related to $\eta_i$ appears, where polymer chains undergo full orientation along shear direction. The second Newtonian region is barely observed in polymer melts, therefore $\eta_i$ is set to zero by default for all unimodal and bimodal PP.

Extensional Viscosity.

Extensional viscosity measurements were conducted using an ARES G-2™ rheometer with an extensional viscosity fixture. Compression molded samples were prepared with a thickness of 0.7 mm, a width of 10 mm and a length of 18 mm. The compression molded samples were tested at a temperature of 172° C. The extension rate was 10 sec$^{-1}$, and extensional viscosity data was recorded at 0.3 seconds.

Capillary Rheology.

Capillary rheology of selected polymers was conducted according to ASTM D3835-02 on an Alpha Technologies™ ARC 2020 capillary rheometer using die Y400-30RC (nominally 1 mm diameter, 30.5 mm length and 90 entry angle) at 190° C. The rheometer was packed and allowed to come to thermal equilibrium for 120 seconds prior to initiating the test. Rabinowitch correction was performed as described at B. Rabinowitch, Z. Physik. Chem., A 145, 1 (1929) using software program LAB KARS Advanced Rheology Software version 3.92 available from Alpha Technologies Services, Akron, Ohio.

EXAMPLES

Methods to Prepare Metallocene Catalyst Compounds:

Generally metallocene catalyst compounds are synthesized as shown below (Scheme 1) where (i) is a deprotonation via a metal salt of alkyl anion (e.g., nBuLi) to form an indenide; (ii) reaction of indenide with an appropriate bridging precursor (e.g., $(CH_3)_2SiCl_2$); (iii) reaction of the above product with AgOTf; (iv) reaction of the above triflate compound with another equivalent of indenide; (v) double deprotonation via an alkyl anion (e.g., nBuLi) to form a dianion; and (vi) reaction of the dianion with a metal halide (e.g., ZrCl$_4$). The final products are obtained by recrystallization of the crude solids.

pretreated with MAO (SMAO) (0.6954 g) was slurried in 20 mL of toluene. The celstir was chilled for 1 min in the freezer (−35° C.) before the catalyst solution was added to the slurry. The slurry was stirred for 1 h while spending 1 min of every 10 min in the freezer. The slurry was then heated to 40° C. and stirred for 2 h. The slurry was filtered Scheme 1

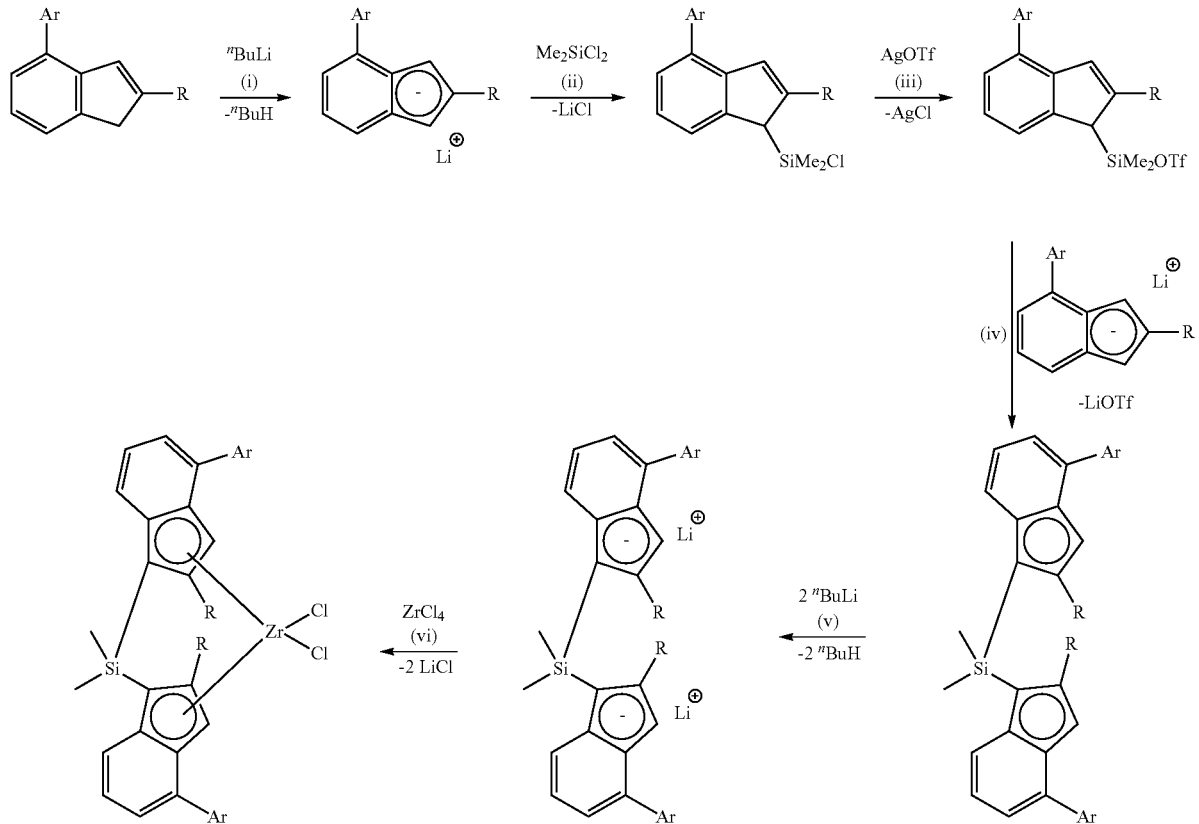

Catalyst:

Dimethylsilyl bis(2-cyclopropyl-4-(3,5-di-tert-butylphenyl)-indenyl) zirconium dichloride (Catalyst A), which is represented by the following formula:

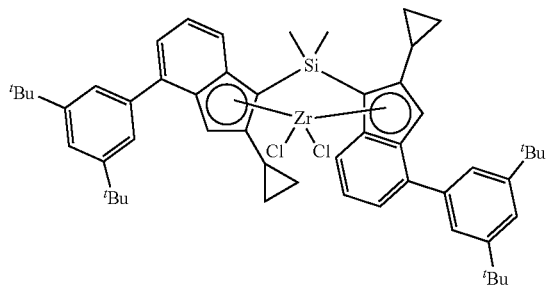

Supported Catalyst:

rac-Dimethylsilyl bis(2-cyclopropyl-4-(3,5-di-tert-butylphenyl)-indenyl) zirconium dichloride (Catalyst D). In a 20 mL vial Catalyst A (25.2 mg, 0.0278 mmol) was stirred alongside MAO (30% by weight in toluene, 0.2345 g of solution) along with another 2 mL of toluene for 1 h. In a small celstir Davison 948 Silica (calcined at 130° C.)

using a fine glass frit, and then reslurried in 20 mL of toluene and stirred for an additional 30 min at 60° C. The slurry was filtered again, and then reslurried in 20 mL of toluene and stirred for an additional 30 min at 60° C. The slurry was filtered, and then reslurried in 20 mL of toluene and stirred for an additional 30 min at 60° C. and then filtered for the final time. The celstir was washed out with 20 mL of toluene and the solid was dried under vacuum. Collected 0.619 g of pink solid. The SMAO is typically prepared as follows: 130° C. calcined Davison 948 Silica (20.8606 g, calcined at 130° C.) was slurried in 121 mL of toluene and chilled in the freezer (approx. −35° C.). MAO (50.5542 g of a 30 wt % solution in toluene) was added slowly in 3 parts with the silica slurry returned to the freezer for a few minutes (approx. 2 minutes) between additions. The slurry was stirred at room temperature for 2 h, filtered with a glass frit filter, reslurried in 80 mL of toluene for 15 min at room temperature, and then filtered again. The solid was reslurried in 80 mL of toluene at 80° C. for 30 min and then filtered. The solid was reslurried in 80 mL of toluene at 80° C. for 30 min and then filtered a final time. The celstir and solid were washed out with 40 mL of toluene. The solid was then washed with pentane and dried under vacuum for 24 h. Collected 28.9406 g of a free flowing white powder Catalyst D.

General Procedure for Making HMW Polypropylene Component:

Catalyst D (ca. 0.6 g) was slurried into dry HYDROBRITE™ oil to yield a slurry that contains 5% by weight of supported catalyst. The supported catalyst was added to the reactor as a slurry in oil. The catalyst slurry containing 60 mg of catalysts was injected using 250 mL propylene into a 2 L autoclave reactor containing propylene (1000 mL) (total propylene 1250 mL), $H_2$ (provided from a 183 mL container under the pressure indicated in Table 1) and tri-n-octylaluminum, 1.0 mL of a 4.76 vol % hexane solution, at ambient temperature for 5 minutes. Subsequently, the reactor temperature was raised to 70° C. and the polymerization was run for an allotted period of time typically 40 or 50 minutes. After the allotted time, the reactor was cooled to room temperature and vented.

TABLE 1

GPC Characterization of HMW Polypropylene Component

| Sample Name | Mw g/mole | Mn g/mole | Mz g/mole | Mw/Mn |
|---|---|---|---|---|
| 1-1 | 242,783 | 54,748 | 747,269 | 4.43 |
| 1-2 | 422,417 | 86,992 | 1,157,445 | 4.86 |

The GPC characterization results in Table 1 demonstrate the z-average molecular weight of resulted polypropylene would be more than 400,000 g/mole, and thus can be suitably used for HMW polypropylene component of the present invention.

Preferred catalyst compounds for propylene polymerization were treated to isolate higher purity rac forms of catalyst via crystallization and to remove the meso form.

Compounding and Injection Molding

The composition ratios and the base materials ("HMW" and "LMW" polypropylene components) are listed in Table 2.

TABLE 2

Unimodal and Inventive Bimodal Polypropylene Compositions

| Sample Name | Description of PP | Blend Ratios (wt %) | MFR (2.16 kg, 230° C.) | Mw g/mole | Mn g/mole | Mz g/mole | Mw/Mn |
|---|---|---|---|---|---|---|---|
| 2-1 | SS Unimodal | 100% HMW | 2.4 | 242,783 | 54,748 | 747,269 | 4.43 |
| 2-2 | SS Unimodal | 100% HMW-2 | 98.0 | 141,479 | 50,396 | 364,536 | 2.81 |
| 2-3 | SS Melt Blended Bimodal | 90% HMW + 10% LMW | 1.9 | 332,993 | 70,958 | 466,026 | 4.69 |
| 2-4 | SS Melt Blended Bimodal | 50% HMW + 50% LMW | 13.7 | 212,530 | 47,317 | 175,197 | 4.49 |
| 2-5 | SS Melt Blended Bimodal | 10% HMW + 90% LMW | 78.0 | 152,789 | 47,247 | 25,444 | 3.23 |

The inventive polypropylene compositions were formulated in an 18-mm Baker Perkins twin screw extruder. A standard additive package consisting of 1000 ppm Irganox™ 1010, 1000 ppm Ultranox™ 626-A (both antioxidants) and 300 ppm DHT-4V (magnesium aluminum hydroxide carbonate, an acid scavenger) was utilized in all compositions to prevent oxidation and maintain stability, and added to the polypropylene flakes/granules prior to the extruder pass. The extruders were not kept under nitrogen, thus, exposed to atmospheric conditions. Compounding in the twin screw extruder through a single pass process was accomplished using an intense mixing screw element. The batch size was 1000 gms. The temperature profile in the various extruder zones was ramped progressively from 350° C. to 450° C. The torque of the twin screws were typically between 40 and 80%, and the melt temperatures were typically between 300 and 450° C. Here and throughout the inventive examples, the polypropylene compositions are non-nucleated.

The GPC data of resultant polypropylene compositions in Table 2 shows that the MWD of the polypropylene compositions is broader than that of the base material of HMW polypropylene component, and thus a bimodal composition was obtained.

Data in Table 3 are cross-fit parameters calculated from the SAOS experiments. The inventors surprisingly find when the amount of HMW polypropylene component is in the range of from 80.0 wt % to 99.9 wt %, the zero shear viscosity (ZSV) of the polypropylene compositions is at least 10, or 20, or 30% higher than the base material of HMW component. For example, when the amount of HMW polypropylene component is 90 wt %, the ZSV of Example RH-14-01-101 (27004 Pa·s) is enhanced 140% than that of HMW polypropylene component alone (11221 Pa·s), which demonstrates the polypropylene compositions have enhanced melt strength.

TABLE 3

SAOS Cross Fit Parameters

| Sample Name | Blend Ratios (wt %) | ZSV $\eta_0$ (Pa · s) | Relaxation Time (sec) | Arrhenius Ea (kJ/mol) |
|---|---|---|---|---|
| 3-1 | 100% HMW | 11,221 | 0.87 | 42.3 |
| 3-2 | 95% HMW + 5% LMW | 33,605 | 2.38 | 40.5 |
| 3-3 | 90% HMW + 10% LMW | 27,004 | 1.94 | 36.7 |
| 3-4 | 80% HMW + 20% LMW | 26,902 | 2.2 | 40.6 |
| 3-5 | 50% HMW + 50% LMW | 6,322 | 1.03 | 39.4 |
| 3-6 | 10% HMW + 90% LMW | 955 | 0.12 | 37.2 |
| 3-7 | 100% LMW | 237 | 0.01 | 34.7 |

The enhanced melt strength can be further seen from the data of extensional viscosity in FIG. 1. The polypropylene compositions exhibit higher extensional viscosity than the base material of HMW component, which can be more than 10,000 Pa·s.

Figure 2:
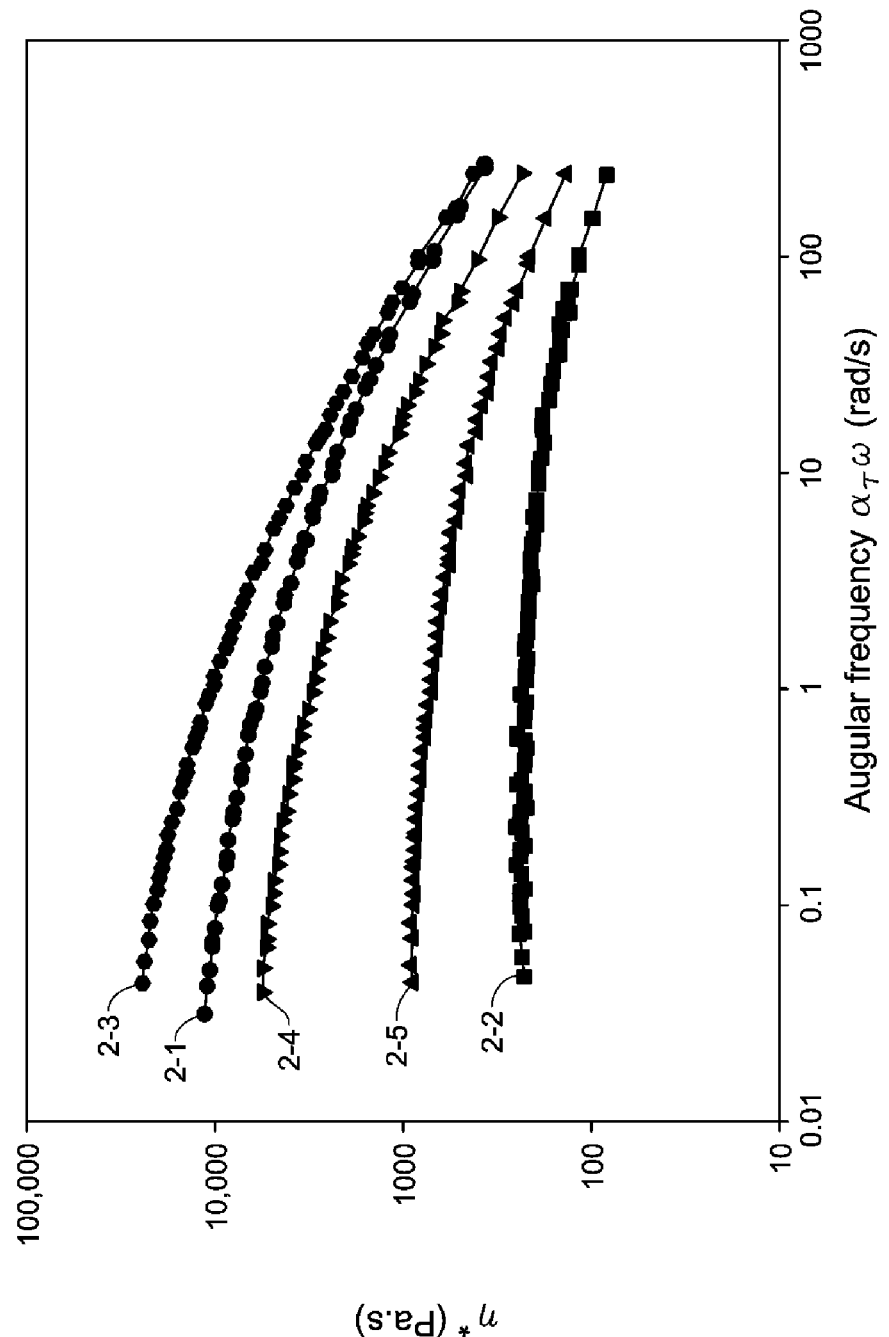
FIG. 2 is a series of plots of the Small Angle Oscillatory Shear (SAOS) frequency sweep on melt blended polypropylene compositions and base material of HMW polypropylene.
Figure 3:
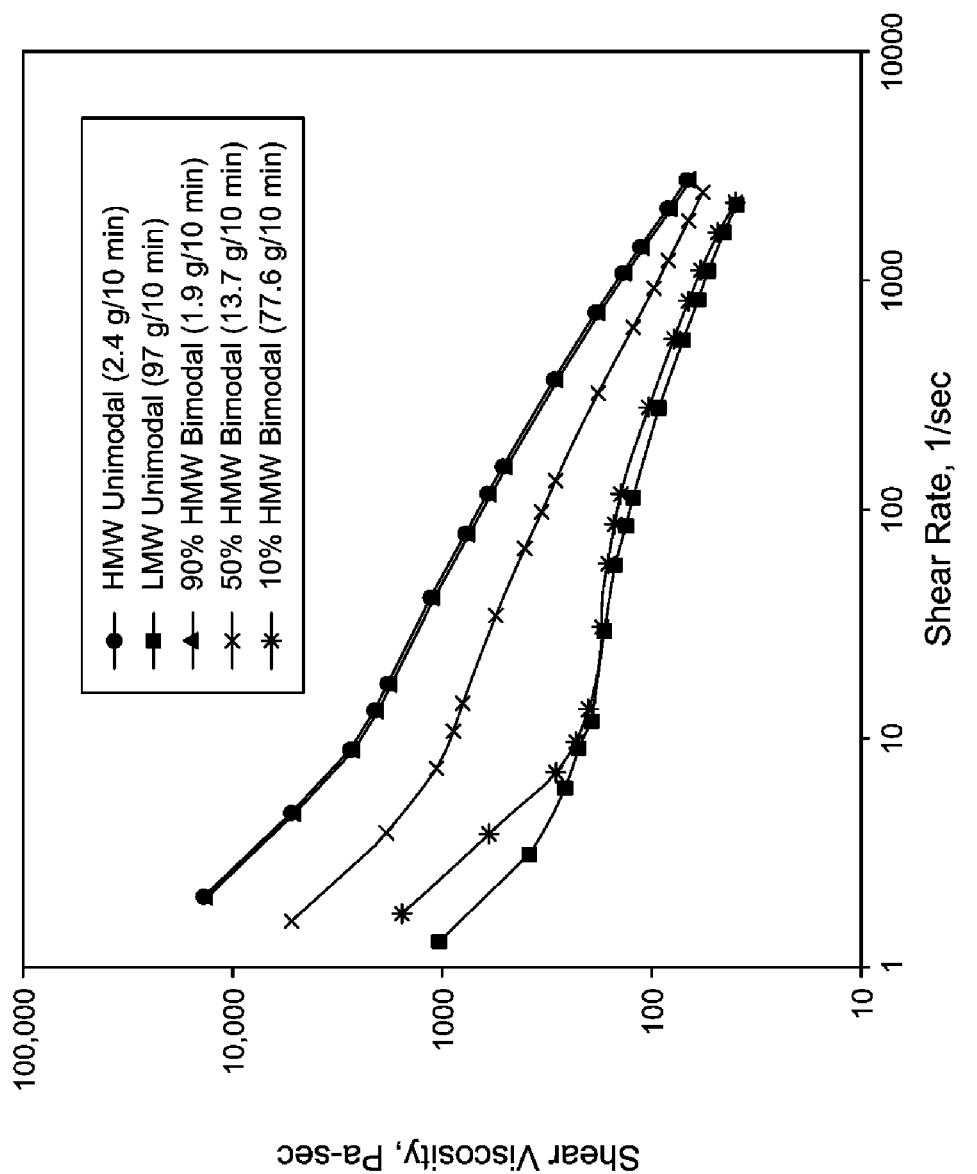
FIG. 3 is a series of plots of the Capillary Rheology strain sweep on melt blended polypropylene compositions and base material of HMW polypropylene.

The differences in complex viscosities at zero shear and high shear in FIG. 2 exemplify the advantages of the bimodal compositions, i.e. exhibiting improved melt strength without sacrificing processability. It can be seen that inventive polypropylene compositions have nearly equivalent processability at low shear frequencies compared to base material of HMW polypropylene component. Similar viscosities at the high shear rates probed by Capillary Rheology in FIG. 3 confirm similar processability under environments similar to commercial processing equipment.

Thus, capillary rheology confirms the utility of existing commercial processing equipment to extract the performance benefits resulting from utilizing the inventive process described herein.

Figure 4:
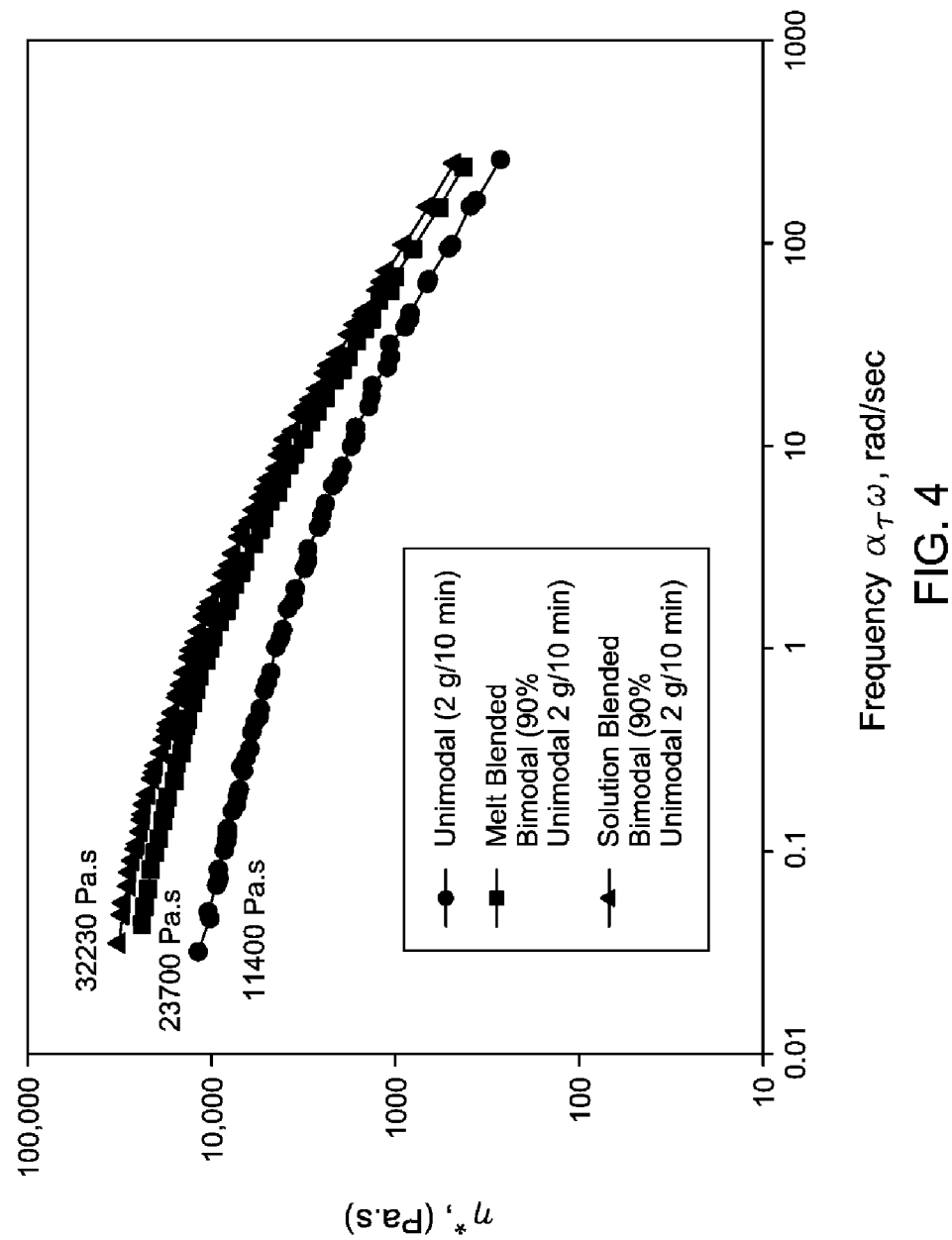
FIG. 4 is a series of plots of the Small Angle Oscillatory Shear (SAOS) frequency sweep on melt and solution blended polypropylene compositions and base material of HMW polypropylene.

To ensure that there was no significant degradation of the HMW and/or LMW polypropylenes used in the single-pass extrusions, comparable blends were made using a solution blending process, and rheological curves obtained for these and the comparable extruded polypropylenes as shown in FIG. 4. It was found that the rheological curves fell on top of one another (thus indistinguishable), indicating no significant degradation of materials during extrusion.

Having described the various features of the inventive melt blended polypropylene compositions and methods of making them, described here in numbered paragraphs is:

1. A polypropylene composition comprising at least one high molecular weight HMW polypropylene component and at least one low molecular weight LMW polypropylene component, wherein the polypropylene composition has any one or more of the following features:
   a) an extensional viscosity of the polypropylene composition is more than 10,000 Pa·s, when measured on an extensional rheometer at a temperature of 172° C., and an extensional rate of 10 second$^{-1}$ measured at 0.3 seconds;
   b) a zero shear viscosity of the polypropylene composition no less than the zero shear viscosity of the HMW polypropylene component alone, as determined in accordance with Small Angle Oscillatory Shear (SAOS) Rheology Test; and/or
   c) a relaxation time of the polypropylene composition of more than 0.9 seconds, as determined in accordance with Small Angle Oscillatory Shear (SAOS) Rheology Test; wherein the HMW polypropylene component has a z-average molecular weight Mz of more than 400,000 g/mole, as determined by Gel Permeation Chromatography (GPC), and is in an amount in the range of from 80.0 wt % to 99.9 wt %, based on the total weight of the composition.
2. The polypropylene composition of paragraph 1, wherein the extensional viscosity of the polypropylene composition is more than 20,000 Pa·s, when measured on an extensional rheometer at a temperature of 172° C., and an extensional rate of 10 second$^{-1}$ measured at 0.3 seconds.
3. The polypropylene composition of paragraphs 1 or 2, wherein the zero shear viscosity of the polypropylene composition is at least 30% greater than the zero shear viscosity of the HMW polypropylene component alone, as determined in accordance with SAOS Rheology Test.
4. The polypropylene composition of any one of paragraphs 1-3, wherein the zero shear viscosity of the polypropylene composition is more than 15,000 Pa·s, as determined in accordance with SAOS Rheology Test.
5. The polypropylene composition of any one of paragraphs 1-4, wherein the relaxation time of the polypropylene composition is more than 1.2 seconds, as determined in accordance with Small Angle Oscillatory Shear (SAOS) Rheology Test.
6. The polypropylene composition of any one of paragraphs 1-5, wherein the Mz of the HMW polypropylene component is in the range of from 600,000 g/mole to 10,000,000 g/mole.
7. The polypropylene composition of any one of paragraphs 1-6, wherein the HMW polypropylene component has a Mw/Mn in the range of from 2.0 to 5.0.
8. The polypropylene composition of any one of paragraphs 1-7, wherein the Melt Flow Rate of the HMW polypropylene component is in the range from 0.5 to 5.0 g/10 min, as determined in accordance with ASTM D1238 (230° C., 2.16 kg).
9. The polypropylene composition of any one of paragraphs 1-8, wherein the HMW polypropylene component is formed from a catalyst system comprising a metallocene catalyst compound represented by the formula:

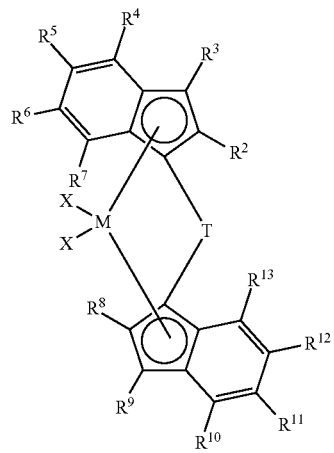

where:
M is a group 4 metal, preferably Hf or Zr;
T is a bridging group;
$R^{14}$ and $R^{15}$ are C1 to C10 alkyl and can form a cyclic group;
X is an anionic leaving group;
each $R^2$, $R^3$, $R^5$, $R^6$, $R^7$, $R^8$, $R^9$, $R^{11}$, $R^{12}$, and $R^{13}$ is independently, a halogen atom, hydrogen, hydrocarbyl, substituted hydrocarbyl, halocarbyl, substituted halocarbyl, silylcarbyl, substituted silylcarbyl, germylcarbyl, substituted germylcarbyl substituents or a —NR'$_2$, —SR', —OR', —OSiR'$_3$, or —PR'$_2$ radical, wherein R' is one of a halogen atom, a C1 to C10 alkyl group, or a C6 to C10 aryl group; and
$R^4$ and $R^{10}$ are phenyl groups substituted at the 3' and 5' positions.

10. The polypropylene composition of any one of paragraphs 1-9, wherein the metallocene catalyst compound comprises one or more of:
dimethylsilyl bis(2-cyclopropyl,4-(3',5'-di-t-butylphenyl)indenyl)ZrCl$_2$;
dimethylsilyl bis(2-cyclopropyl,4-(3',5'-di-t-butylphenyl)indenyl)HfCl$_2$;
dimethylsilyl bis(2-cyclopropyl,4-(3',5'-di-t-phenylphenyl)indenyl)ZrCl$_2$;
dimethylsilyl bis(2-cyclopropyl,4-(3',5'-di-t-phenylphenyl)indenyl)HfCl$_2$;
dimethylsilyl bis(2-cyclopropyl,4-(3',5'-di-isopropylphenyl)indenyl)HfCl$_2$;
dimethylsilyl bis(2-cyclopropyl,4-(3',5'-di-isopropylphenyl)indenyl)ZrCl$_2$;
dimethylsilyl bis(2-cyclopropyl,4-(3',5'-di-methylphenyl)indenyl)HfCl$_2$;
dimethylsilyl bis(2-cyclopropyl,4-(3',5'-di-methylphenyl)indenyl)ZrCl$_2$;
dimethylsilyl bis(2-cyclopropyl,4-(3',5'-di-hexylphenyl)indenyl)HfCl$_2$;

dimethylsilyl bis(2-cyclopropyl,4-(3',5'-di-hexylphenyl)indenyl)ZrCl$_2$;

dimethylsilyl bis(2-cyclopropyl,4-(3',5'-di-n-butylphenyl)indenyl)HfCl$_2$; and/or dimethylsilyl bis(2-cyclopropyl,4-(3',5'-di-t-butylphenyl)indenyl)ZrCl$_2$.

11. The polypropylene composition of any one of paragraphs 1-10, wherein the metallocene catalyst compound has a rac/meso ratio in the range of from 5:1 to 90:1.

12. The polypropylene composition of any one of paragraphs 1-11, wherein the difference in Mw between the HMW polypropylene component and the LMW polypropylene component ΔMw is at least 100,000 g/mole.

13. The polypropylene composition of any one of paragraphs 1-12, wherein the Melt Flow Rate of the LMW polypropylene component is in the range from 10 to 1000 g/10 min, as determined in accordance with ASTM D1238 (230° C., 2.16 kg).

14. The polypropylene composition of any one of paragraphs 1-13, wherein the LMW polypropylene component has a Mw/Mn in the range of from 2.0 to 5.0.

15. The polypropylene composition of any one of paragraphs 1-14, wherein the LMW polypropylene component has a Mw in the range of from 50,000 g/mole to 300,000 g/mole.

16. The polypropylene composition of any one of paragraphs 1-15, wherein the LMW polypropylene component is formed from a single site catalyst.

17. A process to form a polypropylene composition comprising at least one HMW polypropylene component in the range of from 80.0 wt % to 99.9 wt %, based on the total weight of the composition, and at least one LMW polypropylene component, in at least one single pass extrusion, which process comprises:
   a) combining the HMW polypropylene component having a z-average molecular weight Mz of more than 400,000 g/mole with the LMW polypropylene component;
   b) melt blending in an extruder the components in step a) at a melt temperature within a range from 350° C. to 450° C.; and
   c) isolating the blend produced in step b) as the polypropylene composition.

18. The process of paragraph 17, further comprising a step of injection molding or blow molding articles from the polypropylene composition.

19. The process of any one of paragraphs 17-18, wherein the melt blending takes place in an extruder having a feeder zone and a die zone, wherein a temperature gradient is provided from a feeder zone to a die zone of at least +20° C.

20. The process of any one of paragraphs 17-19, wherein the Mz of the HMW polypropylene component is in the range of from 600,000 g/mole to 10,000,000 g/mole.

21. A polymerization process to form HMW polypropylene component having a z-average molecular weight Mz of more than 400,000 g/mole, comprising contacting propylene monomers with a catalyst system comprising a metallocene catalyst compound represented by the formula:

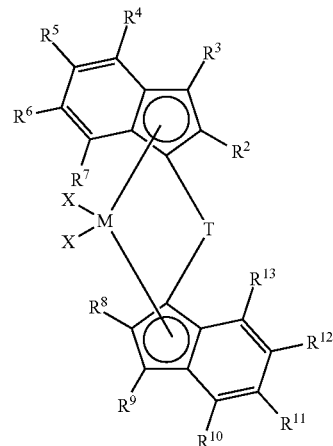

where:
M is a group 4 metal, preferably Hf or Zr;
T is a bridging group, preferably T is Si, Ge, or C;
$R^{14}$ and $R^{15}$ are C1 to C10 alkyl and can form a cyclic group;
X is an anionic leaving group; each $R^2$, $R^3$, $R^5$, $R^6$, $R^7$, $R^8$, $R^9$, $R^{11}$, $R^{12}$, and $R^{13}$ is independently, a halogen atom, hydrogen, hydrocarbyl, substituted hydrocarbyl, halocarbyl, substituted halocarbyl, silylcarbyl, substituted silylcarbyl, germylcarbyl, substituted germylcarbyl substituents or a —NR'$_2$, —SW, —OR', —OSiR'$_3$, or —PR'$_2$ radical, wherein R' is one of a halogen atom, a C1 to C10 alkyl group, or a C6 to C10 aryl group; and $R^4$ and $R^{10}$ are phenyl groups substituted at the 3' and 5' positions.

22. The polymerization process of paragraph 21, wherein the metallocene catalyst compound comprises one or more of:
dimethylsilyl bis(2-cyclopropyl,4-(3',5'-di-t-butylphenyeindenyl)ZrCl$_2$;
dimethylsilyl bis(2-cyclopropyl,4-(3',5'-di-t-butylphenyl)indenyl)HfCl$_2$;
dimethylsilyl bis(2-cyclopropyl,4-(3',5'-di-t-phenylphenyl)indenyl)ZrCl$_2$;
dimethylsilyl bis(2-cyclopropyl,4-(3',5'-di-t-phenylphenyl)indenyl)HfCl$_2$;
dimethylsilyl bis(2-cyclopropyl,4-(3',5'-di-isopropylphenyl)indenyl)HfCl$_2$;
dimethylsilyl bis(2-cyclopropyl,4-(3',5'-di-isopropylphenyl)indenyl)ZrCl$_2$;
dimethylsilyl bis(2-cyclopropyl,4-(3',5'-di-methylphenyl)indenyl)HfCl$_2$;
dimethylsilyl bis(2-cyclopropyl,4-(3',5'-di-methylphenyl)indenyl)ZrCl$_2$;
dimethylsilyl bis(2-cyclopropyl,4-(3',5'-di-hexylphenyl)indenyl)HfCl$_2$;
dimethylsilyl bis(2-cyclopropyl,4-(3',5'-di-hexylphenyl)indenyl)ZrCl$_2$;
dimethylsilyl bis(2-cyclopropyl,4-(3',5'-di-n-butylphenyl)indenyl)HfCl$_2$; and
dimethylsilyl bis(2-cyclopropyl,4-(3',5'-di-t-butylphenyeindenyl)ZrCl$_2$.

23. The polymerization process of any one of paragraphs 21-22, wherein no hydrogen is added.

24. Thermoformed articles, injection molded articles, or blow molded articles, foamed or non-foamed, comprising the polypropylene compositions of any one of paragraphs 1-15.

All documents described herein are incorporated by reference herein for purposes of all jurisdictions where such practice is allowed, including any priority documents, related application and/or testing procedures to the extent they are not inconsistent with this text, provided however that any priority document not named in the initially filed application or filing documents is not incorporated by reference herein.

As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

The invention claimed is:

1. A polypropylene composition comprising at least one high molecular weight (HMW) polypropylene component and at least one low molecular weight (LMW) polypropylene component, wherein the polypropylene composition has any one or more of the following features:
   a) an extensional viscosity of the polypropylene composition of more than 10,000 Pa·s, when measured on an extensional rheometer at a temperature of 172° C., and an extensional rate of 10 second$^{-1}$ measured at 0.3 seconds;
   b) a zero shear viscosity of the polypropylene composition no less than the zero shear viscosity of the HMW polypropylene component alone, as determined in accordance with Small Angle Oscillatory Shear (SAOS) Rheology Test; and/or
   c) a relaxation time of the polypropylene composition of more than 0.9 seconds, as determined in accordance with Small Angle Oscillatory Shear (SAOS) Rheology Test;
   wherein the HMW polypropylene component has a z-average molecular weight Mz of more than 400,000 g/mole, as determined by Gel Permeation Chromatography (GPC), and is in an amount in the range of from 80.0 wt % to 99.9 wt %, based on the total weight of the composition.

2. The polypropylene composition of claim 1, wherein the extensional viscosity of the polypropylene composition is more than 20,000 Pa·s, when measured on an extensional rheometer at a temperature of 172° C., and an extensional rate of 10 second$^{-1}$ measured at 0.3 seconds.

3. The polypropylene composition of claim 1, wherein the zero shear viscosity of the polypropylene composition is at least 30% greater than the zero shear viscosity of the HMW polypropylene component alone, as determined in accordance with SAOS Rheology Test.

4. The polypropylene composition of claim 1, wherein the zero shear viscosity of the polypropylene composition is more than 15,000 Pa·s, as determined in accordance with SAOS Rheology Test.

5. The polypropylene composition of claim 1, wherein the relaxation time of the polypropylene composition is more than 1.2 seconds, as determined in accordance with Small Angle Oscillatory Shear (SAOS) Rheology Test.

6. The polypropylene composition of claim 1, wherein the Mz of the HMW polypropylene component is in the range of from 600,000 g/mole to 10,000,000 g/mole.

7. The polypropylene composition of claim 1, wherein the HMW polypropylene component has a Mw/Mn in the range of from 2.0 to 5.0.

8. The polypropylene composition of claim 1, wherein the Melt Flow Rate of the HMW polypropylene component is in the range from 0.5 to 5.0 g/10 min, as determined in accordance with ASTM D1238 (230° C., 2.16 kg).

9. The polypropylene composition of claim 1, wherein the HMW polypropylene component is formed from a catalyst system comprising a metallocene catalyst compound represented by the formula:

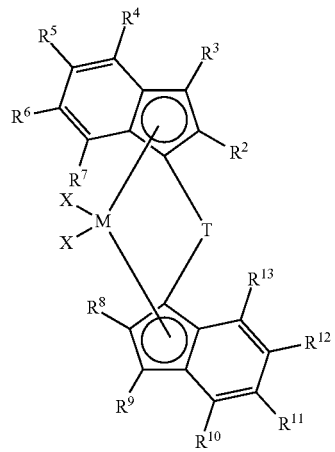

where:

M is a group 4 metal;

T is a bridging group;

X is an anionic leaving group;

each $R^2$, $R^3$, $R^5$, $R^6$, $R^7$, $R^8$, $R^9$, $R^{11}$, $R^{12}$, and $R^{13}$ is independently, a halogen atom, hydrogen, hydrocarbyl, substituted hydrocarbyl, halocarbyl, substituted halocarbyl, silylcarbyl, substituted silylcarbyl, germylcarbyl, substituted germylcarbyl substituents or a —NR'$_2$, —SR', —OR', —OSiR'$_3$ or —PR'$_2$ radical, wherein R' is one of a halogen atom, a $C_1$-$C_{10}$ alkyl group, or a $C_6$-$C_{10}$ aryl group; and $R^4$ and $R^{10}$ are phenyl groups substituted at the 3' and 5' positions.

10. The polypropylene composition of claim 9, wherein the metallocene catalyst compound comprises one or more of:

dimethylsilyl bis(2-cyclopropyl,4-(3',5'-di-t-butylphenyl)indenyl)ZrCl$_2$, dimethylsilyl bis(2-cyclopropyl,4-(3',5'-di-t-butylphenyl)indenyl)HfCl$_2$, dimethylsilyl bis(2-cyclopropyl,4-(3',5'-di-t-phenylphenyl)indenyl)ZrCl$_2$, dimethylsilyl bis(2-cyclopropyl,4-(3',5'-di-t-phenylphenyl)indenyl)HfCl$_2$, dimethylsilyl bis(2-cyclopropyl,4-(3',5'-di-isopropylphenyl)indenyl)HfCl$_2$, dimethylsilyl bis(2-cyclopropyl,4-(3',5'-di-isopropylphenyl)indenyl)ZrCl$_2$, dimethylsilyl bis(2-cyclopropyl,4-(3',5'-di-methylphenyl) indenyl)HfCl$_2$, dimethylsilyl bis(2-cyclopropyl,4-(3',5'-di-methylphenyl) indenyl)ZrCl$_2$, dimethylsilyl bis(2-cyclopropyl,4-(3',5'-di-hexylphenyl) indenyl)HfCl$_2$, dimethylsilyl bis(2-cyclopropyl,4-(3',5'-di-hexylphenyl) indenyl)ZrCl$_2$, dimethylsilyl bis(2-cyclopropyl,4-(3',5'-di-n-butylphenyl) indenyl)HfCl$_2$, and/or dimethylsilyl bis(2-cyclopropyl,4-(3',5'-di-t-butylphenyl) indenyl)ZrCl$_2$.

11. The polypropylene composition of claim 9, wherein the metallocene catalyst compound has a rac/meso ratio in the range of from 5:1 to 90:1.

12. The polypropylene composition of claim 1, wherein the difference in Mw between the HMW polypropylene component and the LMW polypropylene component ΔMw is at least 100,000 g/mole.

13. The polypropylene composition of claim 1, wherein the Melt Flow Rate of the LMW polypropylene component is in the range from 10 to 1000 g/10 min, as determined in accordance with ASTM D1238 (230° C., 2.16 kg).

14. The polypropylene composition of claim 1, wherein the LMW polypropylene component has a Mw/Mn in the range of from 2.0 to 5.0.

15. The polypropylene composition of claim 1, wherein the LMW polypropylene component has a Mw in the range of from 50,000 g/mole to 300,000 g/mole.

16. The polypropylene composition of claim 1, wherein the LMW polypropylene component is formed from a single site catalyst.

17. A process to form the polypropylene composition of claim 1, which process comprises:
a) combining the HMW polypropylene component having a z-average molecular weight Mz of more than 400,000 g/mole with the LMW polypropylene component;
b) melt blending in an extruder the components in step a) at a melt temperature within a range from 350° C. to 450° C.;
c) isolating the blend produced in step b) to produce the polypropylene composition.

18. The process of claim 17, further comprising a step of injection molding or blow molding articles from the polypropylene composition.

19. The process of claim 17, wherein the melt blending takes place in an extruder having a feeder zone and a die zone, wherein a temperature gradient is provided from a feeder zone to a die zone of at least +20° C.

20. The process of claim 17, wherein the Mz of the HMW polypropylene component is in the range of from 600,000 g/mole to 10,000,000 g/mole.

21. A The polymerization process of claim 17, where the HMW polypropylene component having a z-average molecular weight Mz of more than 400,000 g/mole, is formed by a process comprising contacting propylene monomers with a catalyst system comprising a metallocene catalyst compound represented by the formula:

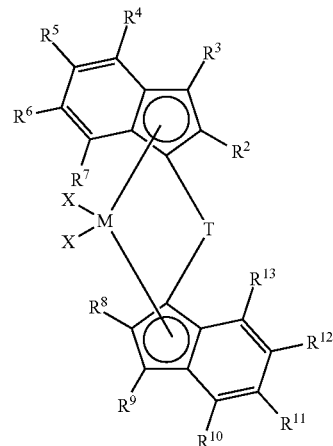

where:
M is a group 4 metal;
T is a bridging group;
X is an anionic leaving group;
each $R^2$, $R^3$, $R^5$, $R^6$, $R^7$, $R^8$, $R^9$, $R^{11}$, $R^{12}$, and $R^{13}$ is independently, a halogen atom, hydrogen, hydrocarbyl, substituted hydrocarbyl, halocarbyl, substituted halocarbyl, silylcarbyl, substituted silylcarbyl, germylcarbyl, substituted germylcarbyl substituents or a —NR'$_2$, —SR', —OR', —OSiR'$_3$ or —PR'$_2$ radical, wherein R' is one of a halogen atom, a $C_1$-$C_{10}$ alkyl group, or a $C_6$-$C_{10}$ aryl group; and
$R^4$ and $R^{10}$ are phenyl groups substituted at the 3' and 5' positions.

22. The polymerization process of claim 21, wherein the metallocene catalyst compound comprises one or more of:
dimethylsilyl bis(2-cyclopropyl,4-(3',5'-di-t-butylphenyl) indenyl)ZrCl$_2$,
dimethylsilyl bis(2-cyclopropyl,4-(3',5'-di-t-butylphenyl) indenyl)HfCl$_2$,
dimethylsilyl bis(2-cyclopropyl,4-(3',5'-di-t-phenylphenyl)indenyl)ZrCl$_2$,
dimethylsilyl bis(2-cyclopropyl,4-(3',5'-di-t-phenylphenyl)indenyl)HfCl$_2$,
dimethylsilyl bis(2-cyclopropyl,4-(3',5'-di-isopropylphenyl)indenyl)HfCl$_2$,
dimethylsilyl bis(2-cyclopropyl,4-(3',5'-di-isopropylphenyl)indenyl)ZrCl$_2$,
dimethylsilyl bis(2-cyclopropyl,4-(3',5'-di-methylphenyl) indenyl)HfCl$_2$,
dimethylsilyl bis(2-cyclopropyl,4-(3',5'-di-methylphenyl) indenyl)ZrCl$_2$,
dimethylsilyl bis(2-cyclopropyl,4-(3',5'-di-hexylphenyl) indenyl)HfCl$_2$,
dimethylsilyl bis(2-cyclopropyl,4-(3',5'-di-hexylphenyl) indenyl)ZrCl$_2$,
dimethylsilyl bis(2-cyclopropyl,4-(3',5'-di-n-butylphenyl) indenyl)HfCl$_2$, and
dimethylsilyl bis(2-cyclopropyl,4-(3',5'-di-t-butylphenyl) indenyl)ZrCl$_2$.

23. The polymerization process of claim 21, wherein no hydrogen is added.

24. Thermoformed articles, injection molded articles, or blow molded articles, foamed or non-foamed, comprising the polypropylene compositions of claim 1.

25. The polypropylene composition of claim 9, wherein M is Hf or Zr.

26. The polymerization process of claim 21, wherein M is Hf or Zr.

\* \* \* \* \*